(12) United States Patent
Hakamada et al.

(10) Patent No.: US 9,126,419 B2
(45) Date of Patent: Sep. 8, 2015

(54) IMAGE PROCESSING DEVICE AND IMAGE PROCESSING METHOD

(75) Inventors: Junichi Hakamada, Ibaraki-ken (JP);
Tsutomu Kurose, Ibaraki-ken (JP);
Takahiko Nakamura, Ibaraki-ken (JP);
Kouichi Nobushima, Ibaraki-ken (JP);
Yoshiyuki Okada, Ibaraki-ken (JP);
Mitsuaki Ishitoya, Ibaraki-ken (JP)

(73) Assignee: RISO KAGAKU CORPORATION, Tokyo (JP)

( * ) Notice: Subject to any disclaimer, the term of this patent is extended or adjusted under 35 U.S.C. 154(b) by 140 days.

(21) Appl. No.: 13/490,603

(22) Filed: Jun. 7, 2012

(65) Prior Publication Data

US 2012/0314260 A1 Dec. 13, 2012

(30) Foreign Application Priority Data

Jun. 8, 2011 (JP) ................ P2011-127903

(51) Int. Cl.
*H04N 1/40* (2006.01)
*H04N 1/46* (2006.01)
*G06K 7/10* (2006.01)
*B41J 2/205* (2006.01)
*G06K 7/14* (2006.01)
*B41J 3/01* (2006.01)
*G06K 15/02* (2006.01)

(52) U.S. Cl.
CPC *B41J 2/2056* (2013.01); *B41J 3/01* (2013.01);
*G06K 7/1439* (2013.01); *G06K 7/1447*
(2013.01); *G06K 15/188* (2013.01); *G06K*
*15/1852* (2013.01); *G06K 15/1871* (2013.01);
*G06K 7/10821* (2013.01); *G06K 7/1452*
(2013.01); *G06T 2207/20192* (2013.01)

(58) Field of Classification Search
USPC ................... 358/1.9–3.28, 518–536
See application file for complete search history.

(56) References Cited

U.S. PATENT DOCUMENTS

| | | | |
|---|---|---|---|
| 5,315,691 A * | 5/1994 | Sumiya et al. ................. | 358/1.9 |
| 6,529,616 B1 * | 3/2003 | Rasmussen et al. .......... | 382/112 |
| 6,600,832 B1 * | 7/2003 | Nakayama et al. ........... | 382/162 |
| 7,391,532 B2 * | 6/2008 | Chizawa ........................ | 358/1.9 |

(Continued)

FOREIGN PATENT DOCUMENTS

| | | |
|---|---|---|
| JP | 11-289464 A | 10/1999 |
| JP | 2006-7707 A | 1/2006 |
| JP | 2009-272667 A | 11/2009 |

OTHER PUBLICATIONS

Japanese Office Action dated Jan. 13, 2015 in counterpart Japanese Application No. 2011-127903.

*Primary Examiner* — Richard Zhu
(74) *Attorney, Agent, or Firm* — Greenblum & Bernstein P.L.C.

(57) ABSTRACT

An image processing device includes a print image data generator and a density adjuster. The print image date generator generates print image data for each of colors to be used to print a document image from image data of the document image including a barcode image and a background image overlapped on the barcode image as a background. The density adjuster performs at least one of processing to reduce the density of the barcode image in at least any one of pieces of the print image data of colors including the barcode image and processing to reduce the density of the background image within a neighboring region that neighbors a bar of the barcode image in at least any one of pieces of the print image data of colors including the background image.

9 Claims, 10 Drawing Sheets (56) References Cited

U.S. PATENT DOCUMENTS

| | | | |
|---|---|---|---|
| 8,054,508 B2* | 11/2011 | Ishii | 358/3.28 |
| 8,174,724 B2* | 5/2012 | Kitora et al. | 358/1.18 |
| 8,240,551 B2* | 8/2012 | Nakata | 235/375 |
| 8,373,903 B2* | 2/2013 | Kumar | 358/3.24 |
| 2002/0196979 A1* | 12/2002 | Yen et al. | 382/190 |
| 2004/0062443 A1* | 4/2004 | Yen et al. | 382/209 |
| 2007/0199992 A1* | 8/2007 | Manheim | 235/462.01 |
| 2008/0266612 A1* | 10/2008 | Nishioka | 358/464 |
| 2009/0244639 A1* | 10/2009 | Itoh et al. | 358/3.28 |
| 2009/0289121 A1* | 11/2009 | Maeda et al. | 235/462.06 |
| 2010/0033741 A1* | 2/2010 | Kido et al. | 358/1.9 |
| 2010/0073729 A1* | 3/2010 | Koyatsu et al. | 358/3.24 |
| 2010/0238514 A1* | 9/2010 | Ishii | 358/3.28 |

* cited by examiner

FIG. 4A
CYAN (C)

FIG. 4B
MAGENTA (M)

FIG. 4C
YELLOW (Y)

FIG. 4D
BLACK (K)

IMAGE PROCESSING DEVICE AND IMAGE PROCESSING METHOD

CROSS REFERENCE TO RELATED APPLICATION

This application claims benefit of priority under 35 U.S.C. §119 to Japanese Patent Application No. 2011-127903, filed on Jun. 8, 2011, the entire contents of which are incorporated by reference herein.

BACKGROUND OF THE INVENTION

1. Field of the Invention

The present invention relates to an image processing device and an image processing method that process image data.

2. Description of the Related Art

Conventionally, techniques to suppress a reduction in reading accuracy of a printed barcode have been proposed.

For example, Patent Document 1 (Japanese Published Unexamined Patent Application No. H11(1999)-289464) discloses that the barcode region is printed only in black (K) in the printer that forms a black color by mixing cyan (C), magenta (M), yellow (Y), and black (K). Consequently, the technique of Patent Document 1 prevents such trouble that it is not possible for a barcode reader to recognize a barcode due to misalignment of print positions between ink colors.

There is a case where a background image, such as a logo and pattern, is overlapped on the background of a barcode. For example, a barcode is printed in a black color and a background image is printed in a color the density of which is low, such as a red color, so that it is possible for a barcode reader to read the barcode despite the presence of the background image. When an image of a barcode on which a background image is overlapped is printed by, for example, an inkjet printer, there is a case where bleeding of ink occurs between a bar and the background image. As a result of this, there used to be a case where reading accuracy is reduced because the boundary between the bar and the background image is hard to recognize when the barcode reader reads the printed barcode.

In such circumstances, a technique capable of suppressing a reduction in reading accuracy of a barcode even if a background image is overlapped on the barcode has been demanded.

SUMMARY OF THE INVENTION

The present invention has been made in view of the above and an object thereof is to provide an image processing device and an image processing method capable of suppressing a reduction in reading accuracy of a barcode printed with a background image overlapped.

In order to achieve the above-mentioned object, the first feature of the image processing device according to the present invention lies in that the image processing device includes a print image data generator that generates print image data for each of colors to be used to print a document image from image data of the document image including a barcode image and a background image overlapped on the barcode image as a background; and a density adjuster that performs at least one of processing to reduce the density of the barcode image in at least any one of pieces of the print image data of colors including the barcode image and processing to reduce the density of the background image within a neighboring region that neighbors a bar of the barcode image in at least any one of pieces of the print image data of colors including the background image.

The second feature of the image processing device according to the present invention lies in that the density adjuster reduces the density of the background image in the print image data of each color including the background image.

The first feature of the image processing method according to the present invention lies in that the image processing method includes generating print image data for each of colors to be used to print a document image from image data of the document image including a barcode image and a background image overlapped on the barcode image as a background; and performing at least one of processing to reduce the density of the barcode image in at least any one of pieces of the print image data of colors including the barcode image and processing to reduce the density of the background image within a neighboring region that neighbors a bar of the barcode image in at least any one of pieces of the print image data of colors including the background image.

The second feature of the image processing method according to the present invention lies in that the image processing method further includes reducing the density of the background image in the print image data of each color including the background image.

According to the first feature of the image processing device according to the present invention, the density adjuster performs at least one of processing to reduce the density of the barcode image in at least any one of pieces of the print image data of colors including the barcode image and processing to reduce the density of the background image within a neighboring region that neighbors a bar of the barcode image in at least any one of pieces of the print image data of colors including the background image. Due to this, bleeding of ink that occurs between the bar and the background image is reduced in the case of printing using ink and the boundary between the bar and the background image is prevented from becoming unclear. Further, the boundary between the bar and the background image is prevented from being blurred, which would occur resulting from misalignment of print positions between colors. Consequently, it is possible to prevent a reduction in accuracy of reading, by a barcode reader, a barcode image which is printed with a background image overlapped.

According to the second feature of the image processing device according to the present invention, the density adjuster reduces the density of the background image in the print image data of each color including the background image. This makes it possible to reduce the density of the whole of the background image while suppressing a change of the hue of the printed background image from the original hue of the document image. Consequently, it is possible to enable the barcode reader to reliably recognize the bar and the space by enlarging the density difference between the bar and the background image.

According to the first feature of the image processing method according to the present invention, at least one of processing to reduce the density of the barcode image in at least any one of pieces of the print image data of colors including the barcode image and processing to reduce the density of the background image within a neighboring region that neighbors a bar of the barcode image in at least any one of pieces of the print image data of colors including the background image is performed. Due to this, bleeding of ink that occurs between the bar and the background is reduced in the case of printing using ink and the boundary between the bar and the background image is prevented from becoming unclear. Further, the boundary between the bar and the background image is prevented from being blurred, which would occur resulting from misalignment of print positions between colors. Consequently, it is possible to prevent a reduction in accuracy of reading, by a barcode reader, a barcode image, which is printed with a background image overlapped.

According to the second feature of the image processing method according to the present invention, the density of the background image in the print image data of each color including the background image is reduced. This makes it possible to reduce the density of the whole of the background image while suppressing a change of the hue of the printed background image from the original hue of the document image. Consequently, it is possible to enable the barcode reader to reliably recognize the bar and the space by enlarging the density difference between the bar and the background image.

DESCRIPTION OF THE EMBODIMENTS

Hereinafter, an exemplary embodiment of the present invention will be described with reference to the drawings. In each drawing, the same or equivalent symbol is attached to the same or equivalent portion or component. However, the drawings are schematic and different from actual ones.

Figure 1:
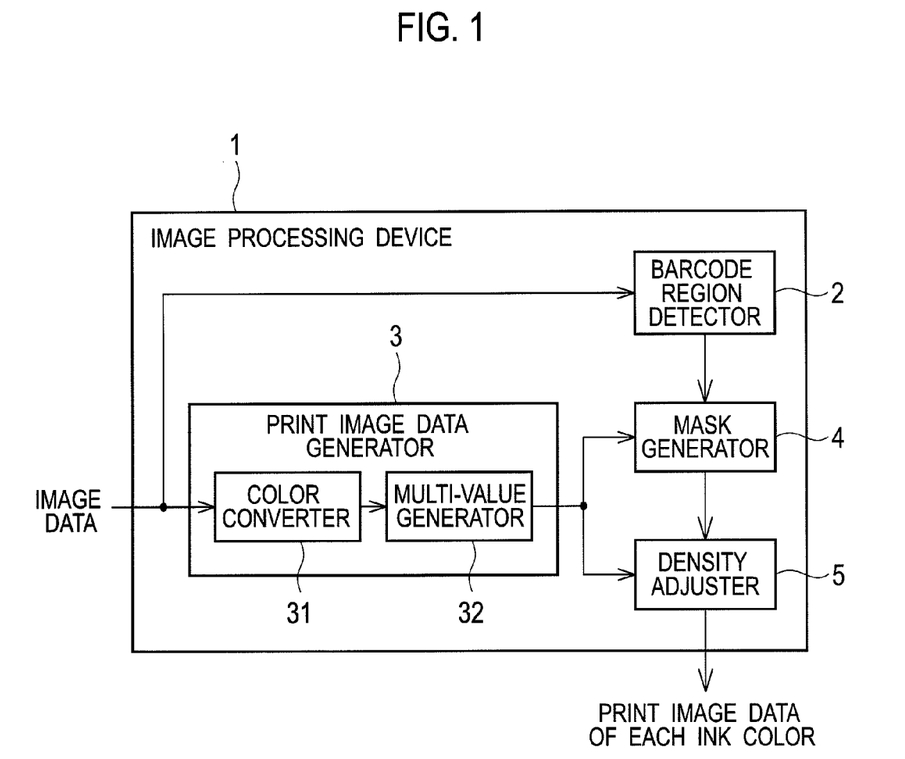
FIG. 1 is a block diagram showing a functional configuration of an image processing device according to an exemplary embodiment of the present invention.

FIG. 1 is a block diagram showing a functional configuration of an image processing device according to an exemplary embodiment of the present invention. As shown in FIG. 1, an image processing device 1 includes a barcode region detector 2, a print image data generator 3, a mask generator 4, and a density adjuster 5.

The barcode region detector 2 detects a barcode region in a document image based on image data of the document image, which is bitmap image data input from a scanner etc., and generates barcode region information indicating the position and range of the barcode region.

Figure 2:
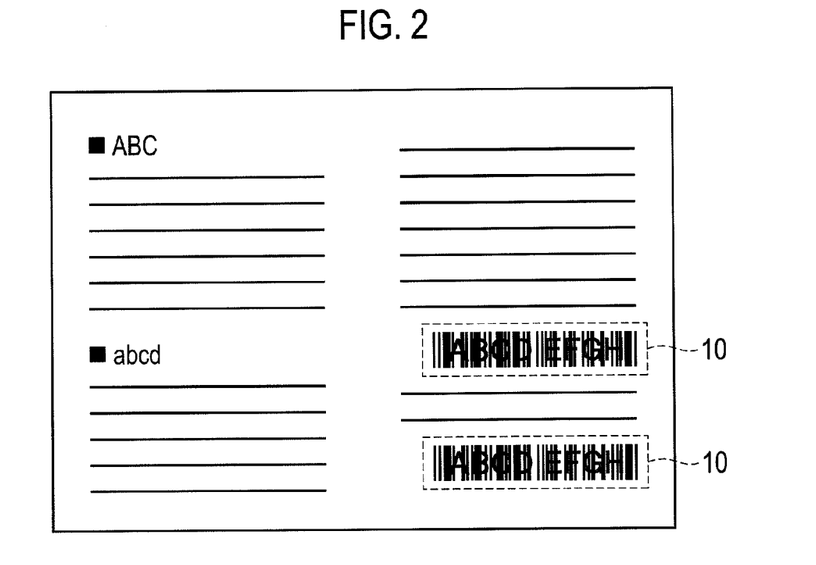
FIG. 2 is a diagram showing an example of a document image.

In the present embodiment, a document image includes a barcode image and a background image overlapped on the barcode image as a background. FIG. 2 is a diagram showing an example of a document image. In FIG. 2, the region enclosed by a broken line is a barcode region 10. The barcode region 10 is a region including a barcode image and a background image but not including other images.

The barcode region detector 2 detects a barcode region from, for example, bitmap image data of a document image by image recognition. Barcode region information is, for example, information indicating the coordinates of the four corners of a rectangular barcode region. When a page description language (PDL) generated in a printer driver is input, it is possible for the barcode region detector 2 to generate barcode region information based on attribute information, such as an object and barcode.

Figure 3:
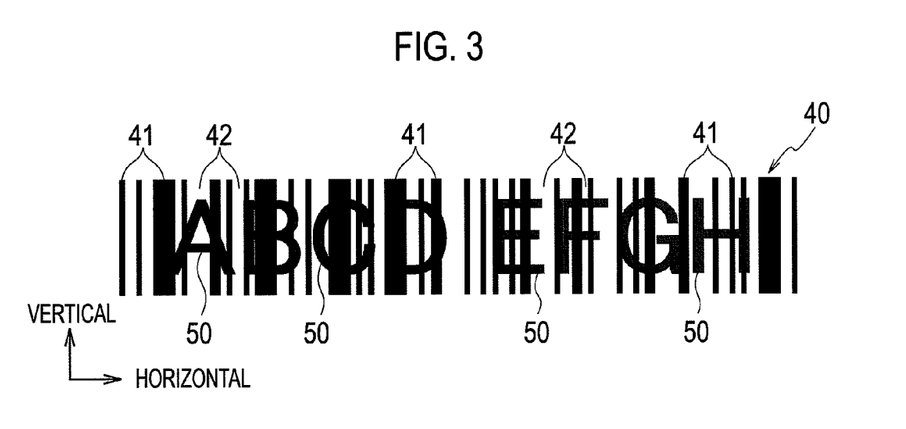
FIG. 3 is a diagram showing an example of a barcode image overlapped by a background image within a barcode region in FIG. 2.

FIG. 3 is a diagram showing an example of a barcode image overlapped by a background image within the barcode region 10 in FIG. 2. As shown in FIG. 3, a barcode image 40 has a plurality of bars 41 elongated vertically. The plurality of bars 41 is arranged in the horizontal direction. Between the bars 41, a space 42 is formed. Information is represented by the thickness (width) of the bar 41 and the space 42. A background image 50 is an image overlapped as a background of the barcode image 40 and can be recognized visually between bars 41 (in the space 42).

Normally, the bar 41 is formed in a deep color (density is high), such as a black color. The space 42 is a white color, which is the color of a medium, such as paper, when the barcode image 40 is printed. A barcode reader reads information by irradiating the printed barcode image 40 with light and discriminating between the bar 41 and the space 42 by a brightness difference of the reflected light. Hence, the background image 50 is formed in a comparatively light color (density is low) so that the difference in density from the barcode image 40 is large enough to enable a barcode reader to read the barcode image 40.

The print image data generator 3 generates print image data for each of ink colors for printing a document image from image data of the document image. In the present embodiment, it is assumed that the print image data generator 3 generates print image data in the format used in printing by an inkjet printer capable of full-color printing using four inks of cyan (C), magenta (M), yellow (Y), and black (K). The print image data generator 3 includes a color converter 31 and a multi-value generator 32.

The color converter 31 generates image data of each ink color of C, M, Y and K by performing color conversion (color separation) of image data of a document image, which is bitmap image data input from a scanner etc. Image data of a document image input from a scanner etc. is, for example, image data in the RGB format. When PDL generated in a printer driver is input, the color converter 31 performs color conversion after converting PDL into bitmap image data and generates image data of each ink color of C, M, Y and K. The color converter 31 performs color conversion by, for example, referring to a lookup table (not shown schematically) in which a correspondence relationship between RGB values and CMYK values is recorded.

Figure 4A:
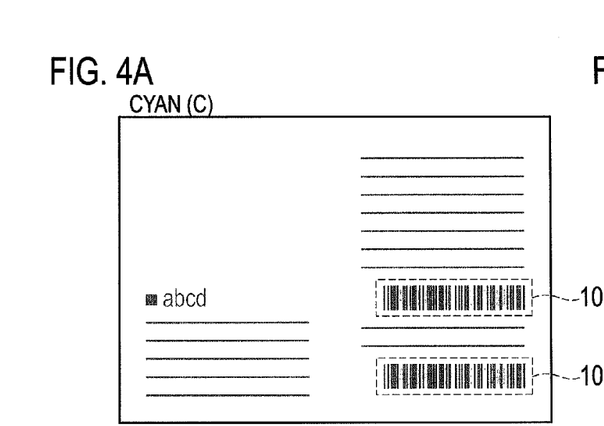
FIG. 4A is a diagram showing an example of an image corresponding to image data of cyan (C) generated from image data of the document image.
Figure 4B:
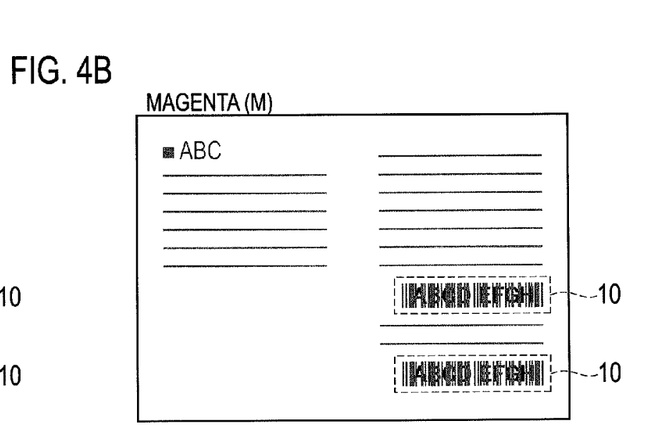
FIG. 4B is a diagram showing an example of an image corresponding to image data of magenta (M) generated from image data of the document image.
Figure 4C:
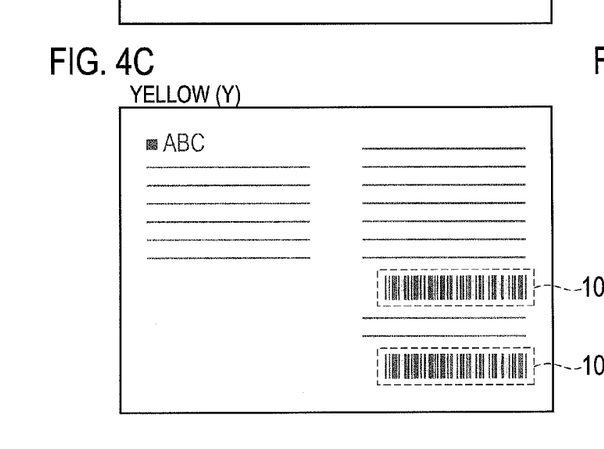
FIG. 4C is a diagram showing an example of an image corresponding to image data of yellow (Y) generated from image data of the document image.
Figure 4D:
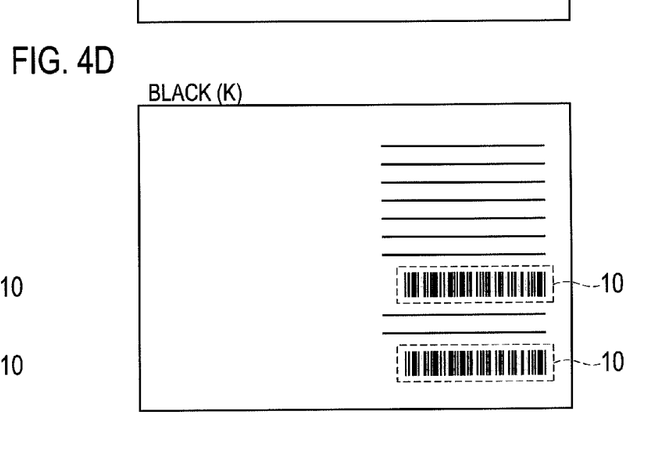
FIG. 4D is a diagram showing an example of an image corresponding to image data of black (K) generated from image data of the document image.

An example of an image corresponding to image data of each ink color of C, M, Y and K generated from the image data of the document image shown in FIG. 2 is shown in FIGS. 4A to 4D. FIG. 4A is an image of cyan (C), FIG. 4B is an image of magenta (M), FIG. 4C is an image of yellow (Y), and FIG. 4D is an image of black (K).

The multi-value generator 32 performs the multi-value error diffusion process etc. on the image data of each ink color of C, M, Y and K generated in the color converter 31 and generates print image data for printing in an inkjet printer. The print image data of each ink color of C, M, Y and K is multi-value data indicating the number of drops of ink of each ink color discharged to each pixel from an inkjet head. The number of drops is set, for example, in eight levels from zero to seven drops. The print image data of each ink color is for printing the image in each of FIGS. 4A to 4D. By printing the images in FIGS. 4A to 4D in an overlapping manner in the inkjet printer, a full-color image is printed.

Figure 5:
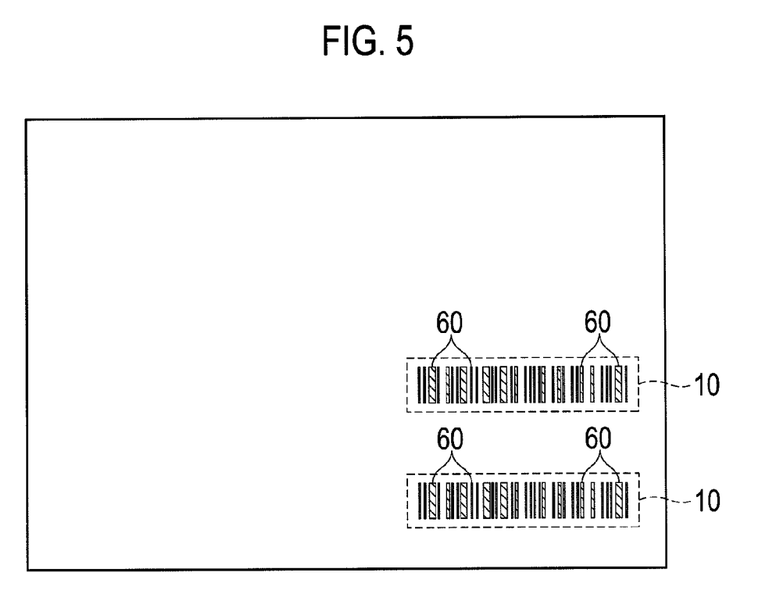
FIG. 5 is a diagram showing a mask region in the document image.
Figure 6:
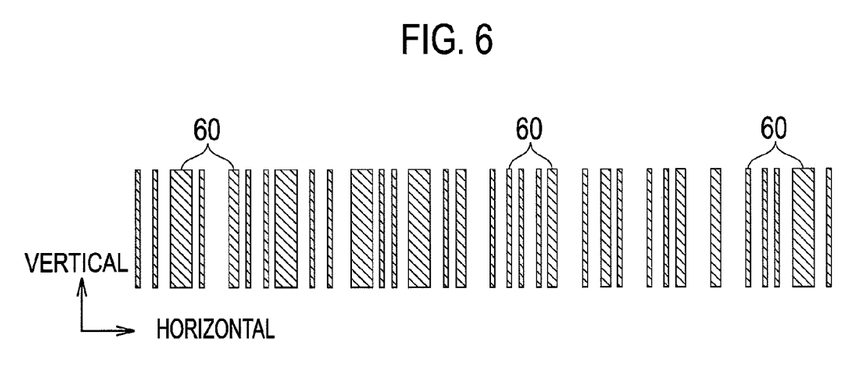
FIG. 6 is an enlarged view of the mask region in FIG. 5.

The mask generator 4 generates mask data using one of pieces of print image data of ink colors of C, M, Y and K and barcode region information. The mask data is data indicating that the region occupied by the bar 41 of the barcode image 40 is a mask region. The mask data is used when the density adjuster 5 adjusts the density of the barcode image 40. FIG. 5 is a diagram showing a mask region in a document image and FIG. 6 is an enlarged view of the mask region in FIG. 5. As shown in FIG. 5 and FIG. 6, a mask region 60 is a region corresponding to the region occupied by the bar 41 of the barcode image 40. The mask data is, for example, data of a mask flag that is set to "1" for a pixel within the mask region 60 (region occupied by the bar 41) and set to "0" for a pixel outside the mask region 60.

Figure 7:
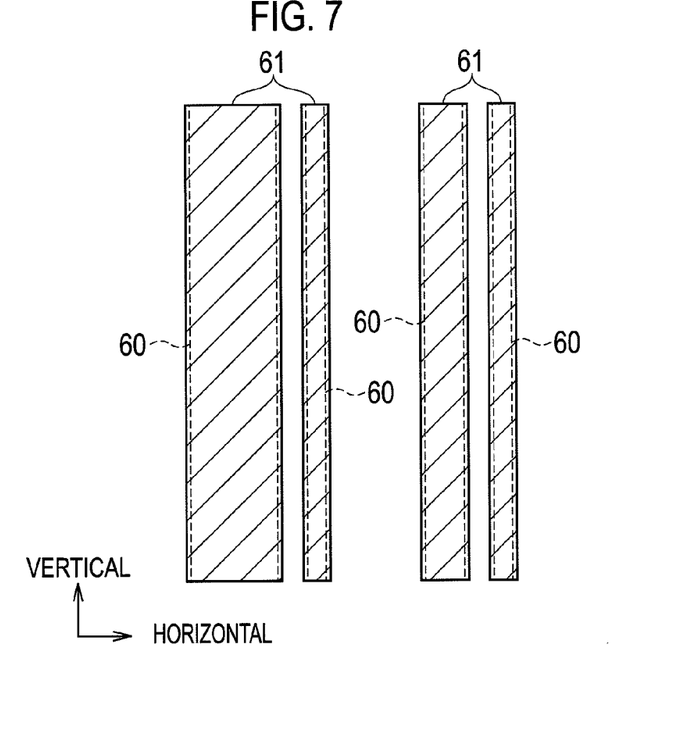
FIG. 7 is an explanatory diagram of the enlarged mask region.

Further, the mask generator 4 generates enlarged mask data indicating an enlarged mask region, which is obtained by enlarging the mask region 60. FIG. 7 is an explanatory diagram of the enlarged mask region. As shown in FIG. 7, an enlarged mask region 61 is a region, which is obtained by enlarging the mask region 60 shown in FIG. 5 and FIG. 6 on both sides in the horizontal direction by an amount corresponding to a predetermined number of pixels. The enlarged mask data is, for example, data of an enlarged mask flag that is set to "1" for a pixel within the enlarged mask region 61 and set to "0" for a pixel outside the enlarged mask region 61. It may also be possible to form an enlarged mask region by enlarging the mask region 60 on both sides in the horizontal direction and on the top and bottom sides in the vertical direction.

Figure 8:
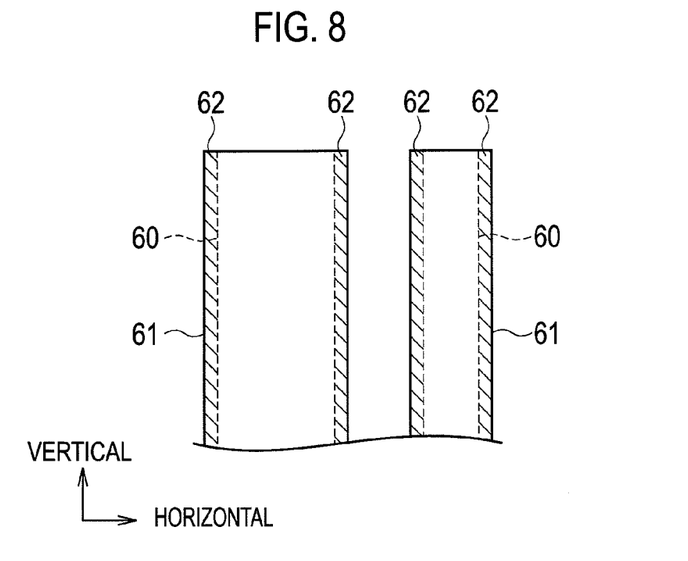
FIG. 8 is an explanatory diagram of a neighboring region.

The density adjuster 5 adjusts the density in the print image data of each ink color using the mask data and the enlarged mask data. Specifically, the density adjuster 5 performs barcode image density adjustment processing to reduce the density of the barcode image 40 in at least any one of pieces of print image data of ink colors including the barcode image 40. Further, the density adjuster 5 performs neighboring region density adjustment processing to reduce the density of the background image 50 within a neighboring region that neighbors the bar 41 of the barcode image 40 in at least any one of pieces of print image data of ink colors including the background image 50. FIG. 8 is an explanatory diagram of a neighboring region. As shown in FIG. 8, a neighboring region 62 is the enlarged mask region 61 from which the mask region 60 is excluded. The barcode image density adjustment processing and the neighboring region density adjustment processing do not necessarily need to be performed both and the density adjuster 5 performs at least one of both. The density adjuster 5 adjusts the density by changing the number of drops in print image data.

Figure 9:
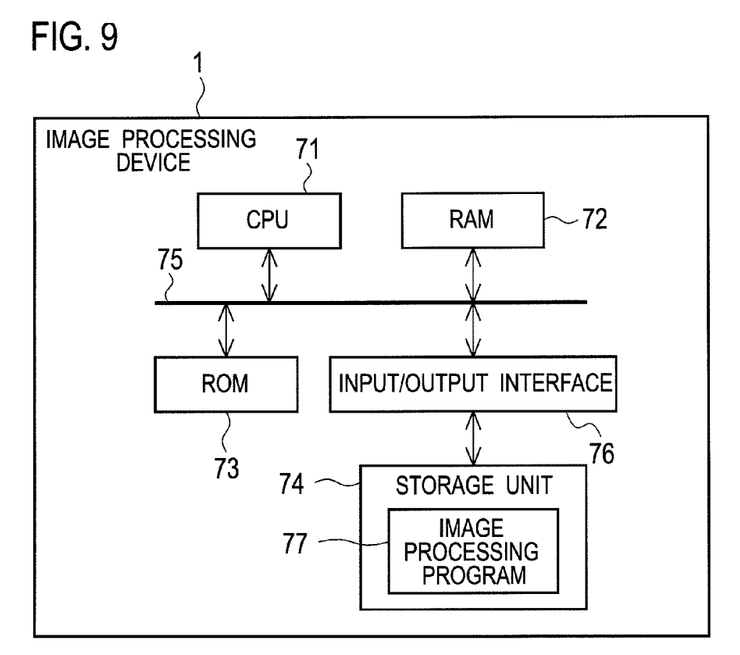
FIG. 9 is a diagram showing a hardware configuration example of an image processing device.

Next, a hardware configuration of the image processing device 1 will be described. FIG. 9 is a diagram showing a hardware configuration example of the image processing device 1.

As shown in FIG. 9, the image processing device 1 includes a CPU 71, a RAM 72, a ROM 73, a storage unit 74, a bus 75, and an input/output interface 76.

The CPU 71 is a central processing unit that totally controls the whole of the image processing device 1. The RAM 72 is used as a work area of the CPU 71 at the time of temporal storing of data and calculation. The ROM 73 stores a basic program etc.

The storage unit 74 includes an HDD (Hard Disk Drive) etc. and stores an image processing program 77. By the CPU 71 executing the image processing program 77, the functions of the barcode region detector 2, the print image data generator 3, the mask generator 4, and the density adjuster 5 are implemented.

The bus 75 connects the CPU 71, the RAM 72, the ROM 73, and the input/output interface 76 and enables transmission/reception of data etc. between them. The input/output interface 76 enables transmission/reception of data etc. between the storage unit 74 and the CPU 71.

Next, the operation of the image processing device 1 will be described.

Figure 10:
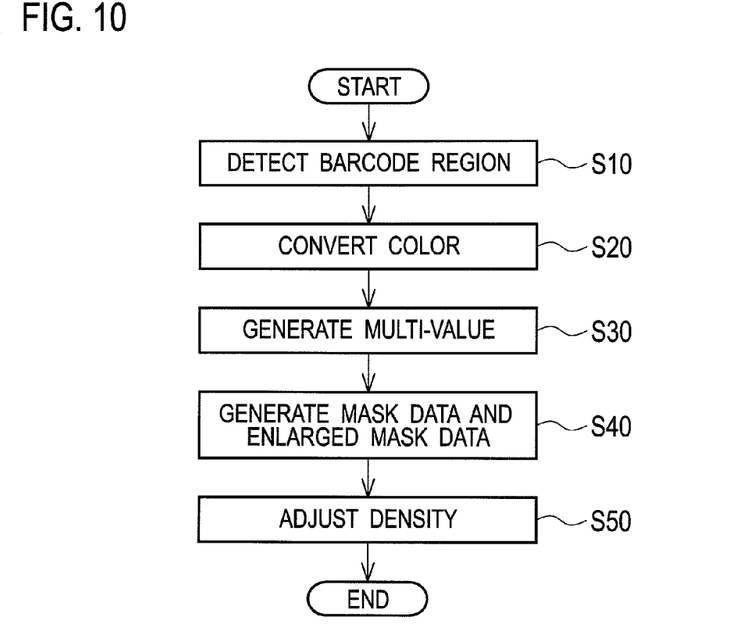
FIG. 10 is a flowchart for explaining an operation of an image processing device according to an exemplary embodiment of the present invention.

FIG. 10 is a flowchart for explaining the operation of the image processing device 1. Here, it is assumed that bitmap image data is input to the image processing device 1 as image data of a document image from a scanner etc.

As shown in FIG. 10, in step S10, the barcode region detector 2 detects a barcode region by image recognition from the image data of the document image that is input. Then, the barcode region detector 2 generates barcode region information indicating the position and range of the barcode region and outputs the information to the mask generator 4.

In step S20, the color converter 31 performs color conversion of the image data of the document image and generates image data of each ink color of C, M, Y and K.

Next, in step S30, the multi-value generator 32 performs the multi-value error diffusion process etc. on the image data of each ink color of C, M, Y and K generated in the color converter 31 and generates print image data of each ink color.

Next, in step S40, the mask generator 4 generates mask data using one of pieces of print image data of ink colors of C, M, Y and K and barcode region information. Further, the mask generator 4 generates enlarged mask data.

The print image data that the mask generator 4 uses for generating mask data is print image data of each ink color (used for printing of the barcode image 40) including the barcode image 40. In the print image data of each ink color, both the barcode image 40 and the background image 50 may be included. Here, as described previously, the barcode image 40 is printed in a deep color and the background image 50 is printed in a light color so that the density difference from the barcode image 40 is large enough. Hence, regarding an ink color in which the number of drops of the pixel of the barcode image 40 is large, it is considered that the number of drops of the pixel of the background image 50 is small. For example, when the barcode image 40 is printed in a black color, in the print image data of black (K), the number of drops is large in the pixel of the barcode image 40 and the number of drops is small in the pixel of the background image 50.

Consequently, the mask generator 4 selects an ink color as a principal print color of the barcode image 40 to be assigned to pixels each in which the number of drops is equal to or more than a predetermined number of drops Dth and whose the number is equal to or more than a predetermined number of pixels Gth in the barcode region 10. The mask generator 4 uses the print image data of the principal print color of the barcode image 40 for generating mask data. The predetermined number of pixels Gth is set, for example, in accordance with the size of the barcode region 10. The mask generator 4 determines that a pixel with the number of drops Dth or more is to be a pixel within the region occupied by the bar 41 of the barcode image 40 in the barcode region 10 in the print image data of the principal print color of the barcode image 40.

Then, the mask generator 4 sets the mask flags of pixels within the region occupied by the bar 41 to "1" and the mask flags of other pixels to "0". In this manner, mask data is generated. Further, the mask generator 4 sets the enlarged mask flags of pixels within a region obtained by enlarging the region occupied by the bar 41 on both sides in the horizontal direction by an amount corresponding to a predetermined number of pixels to "1" and the enlarged mask flags of other pixels to "0". In this manner, enlarged mask data is generated.

Here, for example, it can be considered that there exists an ink color to be assigned to pixels each in which the number of drops is equal to or more than a predetermined number of drops Dth and whose the number is equal to or more than a predetermined number of pixels Gth in the background image 50, not in the barcode image 40. Hence, there may be a case where a plurality of ink colors to be assigned to pixels each in which the number of drops is equal to or more than a predetermined number of drops Dth and whose the number is equal to or more than a predetermined number of pixels Gth is detected in the barcode region 10. As described previously, the barcode image 40 is printed in a deep color and the background image 50 is printed in a light color. Hence, in the printing of the barcode image 40, black (K) and cyan (C), which are deep colors, are used mainly and in the printing of the background image 50, magenta (M) and yellow (Y), which are light colors, are used mainly. It is not considered that in the printing of the background image 50, black (K) is used in a high density.

Accordingly, if black (K) is included in the ink colors to be assigned to pixels each in which the number of drops is equal to or more than a predetermined number of drops Dth and whose the number is equal to or more than a predetermined number of pixels Gth in the barcode region 10, the mask generator 4 selects black (K) as the principal print color of the barcode image 40. If black (K) is not included but cyan (C) is included in the ink colors to be assigned to pixels each in which the number of drops is equal to or more than a predetermined number of drops Dth and whose the number is equal to or more than a predetermined number of pixels Gth in the barcode region 10, the mask generator 4 selects cyan (C) as the principal print color of the barcode image 40. If neither black (K) nor cyan (C) is included, the mask generator 4 determines that an error has occurred and stops processing to generate mask data and enlarged mask data.

The method for generating mask data described above is an example. Any method may be used as long as it is possible to generate mask data indicating the mask region 60 corresponding to the region occupied by the bar 41 of the barcode image 40.

Next, in step S50, the density adjuster 5 adjusts the density in the print image data of each ink color using the mask data and the enlarged mask data. The density adjuster 5 adjusts the density by changing the number of drops in the print image data. The density adjuster 5 outputs the print image data of each ink color after density adjustment to a printing engine of an inkjet printer. It may also be possible for the density adjuster 5 to output the print image data of each ink color to the printing engine without making the density adjustment or to abort output to the printing engine when the mask generator 4 determines that an error has occurred and stops processing to generate mask data and enlarged mask data as described above.

The density adjustment by the density adjuster 5 in step S50 will be described. Here, a case will be described where both the barcode image density adjustment processing and the neighboring region density adjustment processing are performed and in the neighboring region density adjustment processing, the density of the background image 50 within the neighboring region 62 is reduced to "0". Further, it is assumed that the principal print color of the barcode image 40 is black (K).

Figure 11:
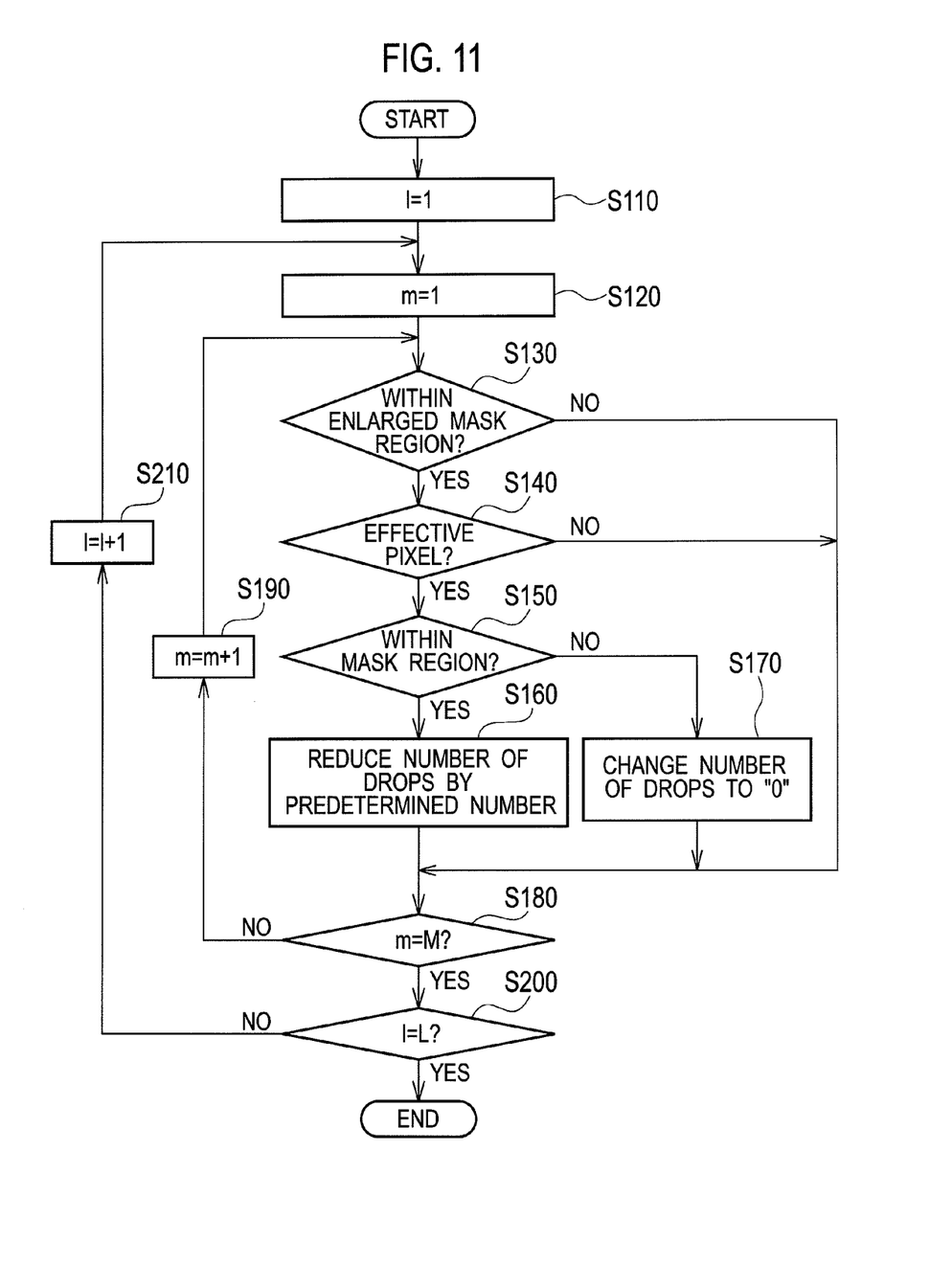
FIG. 11 is a flowchart showing an example of density adjustment processing of a principal print color of a barcode image.

First, the density adjustment in the print image data of black (K) will be described, which is the principal print color of the barcode image 40. FIG. 11 is a flowchart showing an example of the density adjustment processing of the principal print color of the barcode image 40.

As shown in FIG. 11, in step S110, the density adjuster 5 sets 1 to a variable l indicating a line number in the print image data. In step S120, the density adjuster 5 sets 1 to a variable m indicating a pixel number on a line. In step S130, the density adjuster 5 determines whether or not the m-th pixel (target pixel) on the first line is a pixel within the enlarged mask region 61 based on the enlarged mask data.

When determining that the target pixel is not a pixel within the enlarged mask region 61 (step S130: NO), the density adjuster 5 proceeds to processing in step S180 without changing the number of drops of the target pixel (without adjusting the density). When determining that the target pixel is a pixel within the enlarged mask region 61 (step S130: YES), the density adjuster 5 determines whether or not the target pixel is an effective pixel in step S140. An effective pixel is a pixel with the number of drops being not "0".

When determining that the target pixel is not an effective target, that is, determining that the number of drops of the target pixel is "0" (step S140: NO), the density adjuster 5 proceeds to processing in step S180 without changing the number of drops of the target pixel. When determining that the target pixel is an effective pixel (step S140: YES), the density adjuster 5 determines whether or not the target pixel is a pixel within the mask region 60 based on the mask data in step S150.

When determining that the target pixel is a pixel within the mask region 60 (step S150: YES), the density adjuster 5 reduces the number of drops of the target pixel by a predetermined number set in advance in step S160. After this, the density adjuster 5 proceeds to processing in step S180. When determining that the target pixel is not a pixel within the mask region 60 (step S150: NO), the density adjuster 5 changes the number of drops of the target pixel to "0" in step S170. After this, the density adjuster 5 proceeds to processing in step S180.

In step S180, the density adjuster 5 determines whether or not the variable m is M, which is a pixel number indicating the final pixel on one line. When determining that m is not M (step S180: NO), the density adjuster 5 adds 1 to the variable m in step S190. After this, the density adjuster 5 returns to the processing in step S130. When determining that m=M (step S180: YES), the density adjuster 5 determines whether or not the variable l is L, which is a line number indicating the final line, in step S200.

When determining that l is not L (step S200: NO), the density adjuster 5 adds 1 to the variable l in step S210. After this, the density adjuster 5 returns to the processing in step S120. When determining that l=L (step S200: YES), the density adjuster 5 exits the series of density adjustment processing.

Figure 12:
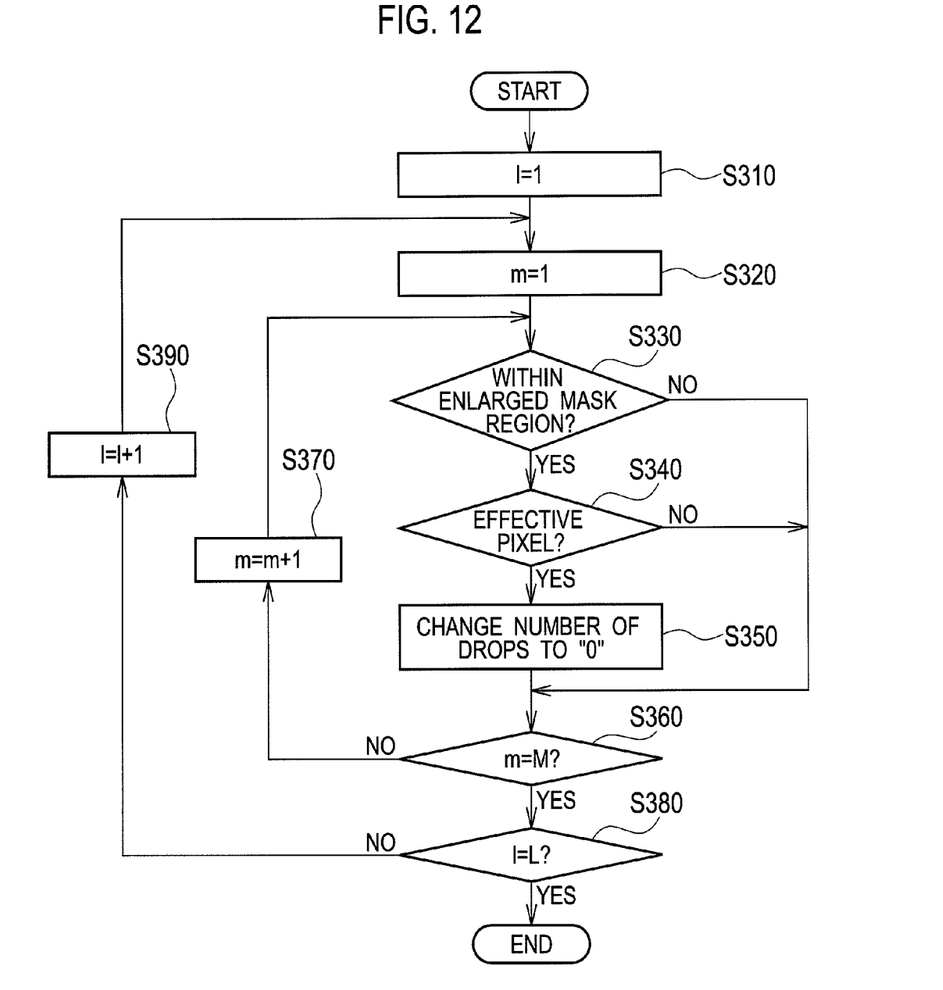
FIG. 12 is a flowchart showing an example of density adjustment processing of an ink color other than the principal print color of a barcode image.

Next, the density adjustment in print image data of cyan (C), magenta (M), and yellow (Y), which are ink colors other than the principal print color of the barcode image 40, will be described. The density adjuster 5 performs the same processing on the print image data of each ink color of cyan (C), magenta (M), and yellow (Y). FIG. 12 is a flowchart showing an example of density adjustment processing of an ink color other than the principal print color of the barcode image 40.

Steps S310 to S340 in FIG. 12 are the same as steps S110 to S140 in FIG. 11 described previously.

When determining that the target pixel is an effective pixel in step S340 (step 340: YES), the density adjuster 5 changes the number of drops of the target pixel to "0" in step S350. After this, the density adjuster 5 proceeds to processing in step S360. When determining that the target pixel is not an effective pixel (step 340: NO), the density adjuster 5 proceeds to processing in step S360 without changing the number of drops of the target pixel.

Steps S360 to S390 are the same as steps S180 to S210 in FIG. 11 described previously.

By the density adjustment processing of black (K), which is the principal print color of the barcode image 40, described using FIG. 11, the density of the barcode image 40 in the print image data of black (K) is reduced and the density of the background image 50 within the neighboring region 62 is reduced to "0".

Figure 13:
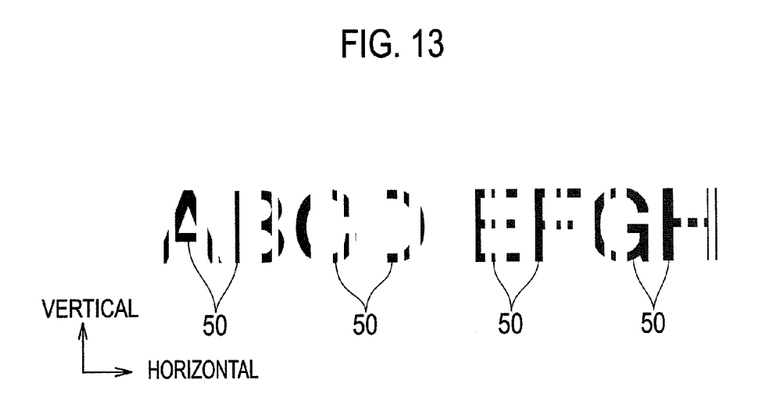
FIG. 13 is a diagram showing an example of an image within a barcode region corresponding to the print image data after the density adjustment processing of an ink color other than the principal print color of a barcode image.

Further, by the density adjustment processing of each ink color, such as cyan (C), described using FIG. 12, the density of the barcode image 40 in the print image data of each ink color, such as cyan (C), and the density of the background image 50 within the neighboring region 62 are reduced to "0". The image within the barcode region 10 corresponding to the print image data after the density adjustment processing in FIG. 12 changes to, for example as shown in FIG. 13, an image representing the background image 50, in which the density of the barcode image 40 and the part of the neighboring region 62 is reduced to "0".

In the example described above, the processing (step S160) to reduce the number of drops of the pixel within the mask region 60 of the print image data of black (K) in FIG. 11 and the processing (part of step S350) to change the number of drops of the pixel within the mask region 60 of the print image data of each color, such as cyan (C), to "0" in FIG. 12 correspond to the barcode image density adjustment processing. Further, the processing (step S170) to change the number of drops of the pixel of the background image 50 within the neighboring region 62 of the print image data of black (K) to "0" in FIG. 11 and the processing (part of step S350) to change the number of drops of the pixel of the background image 50 within the neighboring region 62 of the print image data of each ink color, such as cyan (C), to "0" in FIG. 12 correspond to the neighboring region density adjustment processing.

Figure 14:
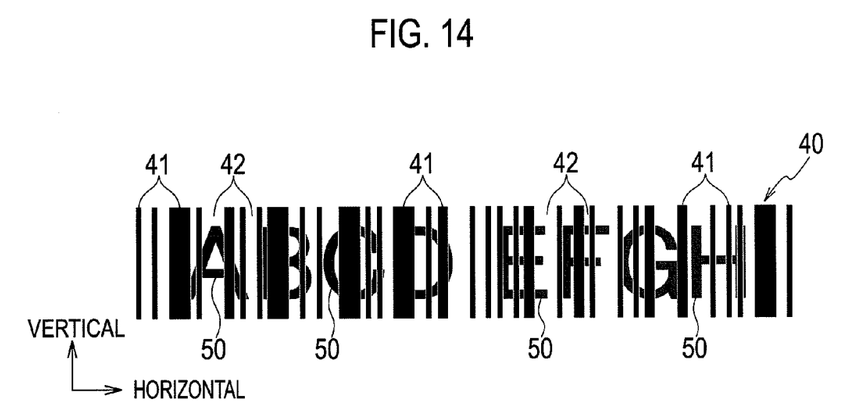
FIG. 14 is a diagram showing an image printed using the print image data of each ink color after the density adjustment.
Figure 15:
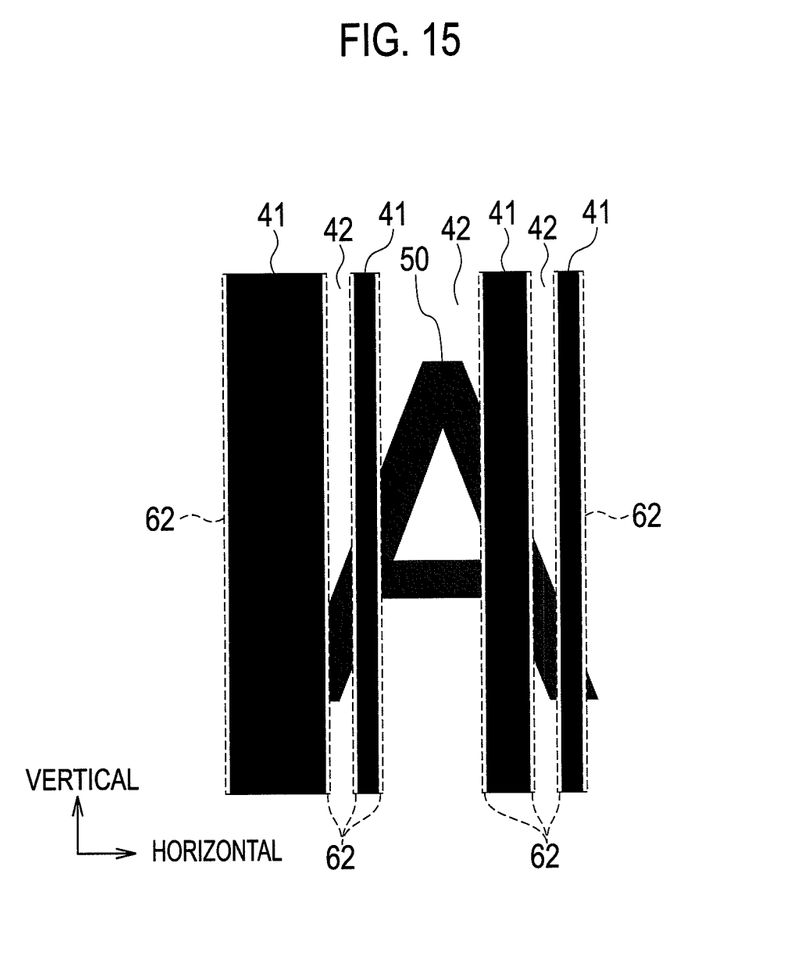
FIG. 15 is a partially enlarged view of FIG. 14.

FIG. 14 is a diagram showing an image printed using the print image data of each ink color after the density adjustment by the density adjustment processing described using FIG. 11 and FIG. 12, and FIG. 15 is a partially enlarged view of FIG. 14.

By the density adjustment processing described using FIG. 11 and FIG. 12, the density of each ink color within the neighboring region 62 is reduced to "0". Hence, as shown in FIG. 14 and FIG. 15, in the printed image, a blank is formed in the part where the background image 50 comes into contact with the bar 41 of the barcode image 40. Due to this, the occurrence of bleeding of ink is suppressed between the bar 41 and the background image 50. As a result of this, the widths of the bar 41 and the space 42 are read accurately when the barcode reader reads the barcode image 40, and therefore, a reduction in reading accuracy is suppressed. The density adjustment of the background image 50 outside the neighboring region 62 is not made, and therefore, the change of the background image 50 is suppressed.

In the barcode image density adjustment processing in the example described above using FIG. 11 to FIG. 15, the number of drops of the pixel of the barcode image 40 in black (K), which is the principal print color of the barcode image 40, is reduced and the number of drops of the pixels of the barcode image 40 in other ink colors is reduced to "0", but, the barcode image density adjustment processing is not limited to this. Any barcode image density adjustment processing may be accepted as long as the number of drops (density) of the barcode image 40 in at least any one of pieces of the print image data of ink colors including the barcode image 40 is reduced. It is preferable for the density adjuster 5 to adjust the number of drops of the barcode image 40 in the print image data of each ink color used for printing of the barcode image 40 so that the barcode image 40 when printed maintains the original hue of the document image.

Further, in the neighboring region density adjustment processing in the example described above, the number of drops of the pixel of the background image 50 within the neighboring region 62 of the print image data of each color is reduced to "0", but, the neighboring region density adjustment processing is not limited to this. Any neighboring region density adjustment processing may be accepted as long as the number of drops (density) of the background image 50 within the neighboring region 62 in at least any one of pieces of the print image data of ink colors including the background image 50 is reduced.

Furthermore, it is not necessarily required to perform both the barcode image density adjustment processing and the neighboring region density adjustment processing and it is sufficient for the density adjuster 5 to perform at least one of both.

As described above, in the image processing device 1 of the present embodiment, the amount of ink discharged to the vicinity of the boundary between the bar 41 and the background image 50 is reduced at the time of inkjet printing by performing at least one of the barcode image density adjustment processing and the neighboring region density adjustment processing. Due to this, bleeding of ink that occurs between the bar 41 and the background image 50 is reduced and the boundary between the bar 41 and the background image 50 is prevented from becoming unclear. Further, the boundary between the bar 41 and the background image 50 is also prevented from becoming unclear, which would occur resulting from misalignment of print positions between ink colors. Consequently, according to the image processing device 1, it is possible to suppress a reduction in reading accuracy of the barcode image 40 by a barcode reader, which is printed with the background image 50 overlapped.

Further, the image processing device 1 makes density adjustment of only the barcode image 40 and the background image 50 within the barcode region 10, and therefore, it is possible to maintain the density in other regions in the document image.

It may also be possible for the density adjuster 5 to reduce the density of the background image 50 in the print image data of each ink color (used for printing of the background image 50) including the background image 50. In this case, the density adjuster 5 adjusts the number of drops of the background image 50 in the print image data of each ink color so as to prevent the hue of the background image 50 from changing from the original hue of the document image. Due to this, it is made possible to reduce the density of the whole of the background image 50 while preventing the hue of the printed background image 50 from changing from the original hue of the document image. As a result of this, it is possible for the image processing device 1 to enable a barcode reader to reliably recognize the bar 41 and the space 42 by enlarging the density difference between the bar 41 and the background image 50.

In the embodiment described above, the image processing device 1 generates print image data used for printing by an inkjet printer, but, it is also possible to apply the present invention to a case where print image data used by a printer of another system is generated. Even in a case of a printer that uses coloring materials other than ink, it is possible to suppress a reduction in reading accuracy of the barcode image 40, which would occur resulting from misalignment of print positions between colors by making the density adjustment of the present embodiment.

It is needless to say that the present invention includes various embodiments not described here. Consequently, the technical scope of the present invention should be specified only by the subject matter according to the scope of claims relevant from the explanation described above.

What is claimed is:

1. An image processing device, comprising:
   a print image data generator that generates print image data for each of colors to be used to print a document image from image data of the document image,
   the image data including
      a barcode image comprising a barcode, and
      a background image overlapped on the barcode image as a background;
   a barcode region detector that detects a barcode region in the image data of the document image;
   a mask generator that
      detects a principal print color of the barcode image based on the print image data for each of colors in the barcode region, and
      generates mask data based on the print image data for the principal print color in the barcode region, wherein the mask data indicates a mask region occupied by a bar of the barcode image; and
   a density adjuster that reduces a density of pixels inside the mask region, by using the mask data, in at least any one of pieces of the print image data of colors for the barcode image.

2. The image processing device according to claim 1, wherein
   the mask generator generates an enlarged mask data that indicates an enlarged mask region obtained by enlarging the mask region at least in a width direction of the bar of the barcode image by a predetermined number of pixels, and
   the density adjuster reduces the density of pixels inside the enlarged mask region except inside the mask region, by using the mask data and the enlarged mask data, in at least any one of pieces of the print image data of colors for the background image.

3. The image processing device according to claim 1, wherein
   the barcode of the barcode image comprises colors other than black.

4. The image processing device according to claim 1, wherein
   the reduction of the density in the pixels reduces, but not eliminate, an amount of ink to be ejected.

5. The image processing device according to claim 1, wherein
   the mask region is a region in which a portion of the bar of the barcode image and a portion of the background image are overlapping in the image data.

6. An image processing device, comprising:
   a print image data generator that generates print image data for each of colors to be used to print a document image from image data of the document image,
   the image data including
      a barcode image comprising a barcode, and
      a background image overlapped on the barcode image as a background;
   a barcode region detector that detects a barcode region in the image data of the document image;
   a mask generator that
      detects a principal print color of the barcode image based on the print image data for each of colors in the barcode region,
      generates mask data based on the print image data for the principal print color in the barcode region, wherein the mask data indicates a mask region occupied by a bar of the barcode image, and
      generates an enlarged mask data that indicates an enlarged mask region obtained by enlarging the mask region at least in a width direction of the bar of the barcode image by a predetermined number of pixels; and
   a density adjuster that reduces a density of pixels inside the enlarged mask region except inside the mask region, by using the mask data and the enlarged mask data, in at least any one of pieces of the print image data of colors for the background image.

7. The image processing device according to claim 6, wherein
   the print image data indicates a number of drops of ink discharged to each pixel from an inkjet head of an inkjet printer, and
   the density adjuster reduces the density of pixels by reducing the number of drops of ink discharged to each pixel.

8. The image processing device according to claim 6, wherein
   the enlarged mask region includes the mask region and additional pixels within a predetermined distance from the mask region, the additional pixels corresponding only with the background image among the background image and the barcode image.

9. An image processing method comprising:
   generating print image data for each of colors to be used to print a document image from image data of the document image, the image data including
      a barcode image comprising a barcode, and
      a background image overlapped on the barcode image as a background;
   detecting a barcode region in the image data of the document image;

detecting a principal print color of the barcode image based on the print image data for each of colors in the barcode region;

generating mask data based on the print image data for the principal print color in the barcode region, wherein the mask data indicates a mask region occupied by a bar of the barcode image;

generating an enlarged mask data that indicates an enlarged mask region obtained by enlarging the mask region at least in a width direction of the bar of the barcode image by a predetermined number of pixels; and performing at least one of
- processing to reduce density of pixels inside the mask region, by using the mask data, in at least any one of pieces of the print image data of colors for the barcode image, and
- processing to reduce density of pixels inside the enlarged mask region except inside the mask region, by using the mask data and the enlarged mask data, in at least any one of pieces of the print image data of colors for the background image.

* * * * *